CLASSIFICATION
7767-X
DIVISION.
L. Dale & P. B. Curtis's
Thrashing Machine.
9-17-1833 Vol. 10. p. 77
Patented: 17th Sept: 1833
References.
a. Frame.
b. Concave.
c. Hanger.
d. Bolts.
e. Cylinder.
f. Arbor.
g. Box
h. Pulley.
i. Hopper.
k. Dust board.
N.B. Cap of cylinder removed.
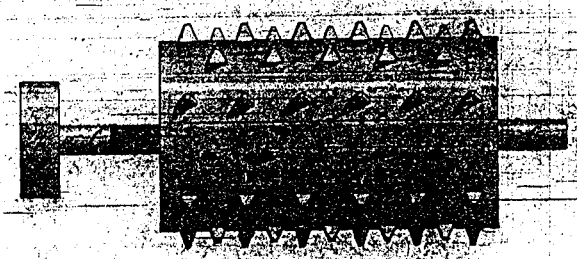
Longitudinal Section.
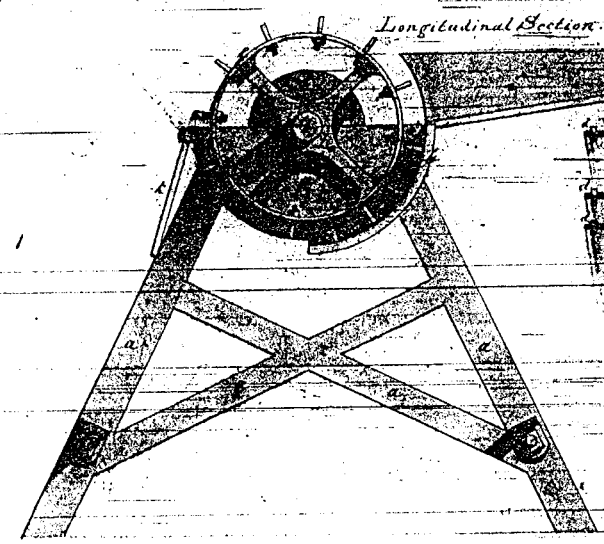
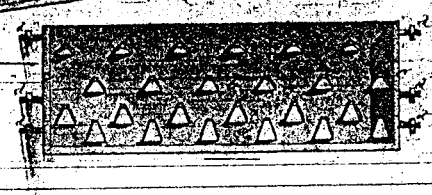
Patent Office. 11 Sept. 1839.
Made under the direction of the Commissioner of Patents, in conformity with Act: 3d March 1837.
Comm: of Patents.

7767 Sept 17, 1833

Linus Yale & Philo C. Curtis Citizens.

Letters Patent

The Schedule referred to in these letters Patent, and making part
of the same, containing a description in the words of the said Linus
Yale & Philo C. Curtis, themselves of their Improvement in the Thresh-
ing Machine.

We make a frame of Cast Iron 2 feet long & 22 inches high
the ends are a half circle of 12 inches with the straight edge up.
with legs 2 inches in width, running from the round or lower edge
2 inches below the corner in a slanting direction. with feet on
the lower end, standing 2 feet 2 inches apart on the floor, with
cross girts between the two legs below the half circle, the whole is 3/8
inch thick with Mouldings on the edges projecting outside the
Machine, on the top of the half circle in the centre is a box projecting
outside the Machine to form a bearing of three inches in length,
these two ends are fastened together by 2 Sills of Cast iron 2 ft.
long, with flanges at right angles on the ends thro which are
bolts and screws to hold them firm, between the ends of the Machine
about 6 inches above the feet, & a concave 2 feet long & 1/2 an
inch thick on a circle of 13 1/2 inches & about 9 inches wide with
flanges rising at right angles at the ends thro which are bolts
which bolt it to the ends of the Machine to correspond with the lower
edge of the half circle above described. In this concave are 6 rows
of Cogs, or Studs 1 1/2 inch high one inch wide at the bottom & 1/2 inch
thick at the bottom & tapering towards the top. set 2 inches apart in the
rows in a zig zag position so as to form 24 spaces 3/4 inch wide
across the bottom of the Concave for the Spikes or Cogs in the cylinder
to pass thro.— The Cylinder is made of Sheet iron 1/8 inch thick
2 feet long & 10 inches in diameter bent round & brazed or [illegible]
together, the Spikes or Cogs are made (nearly the shape of the teeth
in the concave) of wrought iron, or steel with a large head on the

X7767 inside of the cylinder, & the outside is to set down with a swedge
when not to form a shoulder on the outside of the cylinder and
projecting 1½ inch from the cylinder, & so placed that 3 spikes will
pass thro each space in the concave, the heads of the cylinder may
be either cast iron, or wood, thro which runs an arbor of iron, or steel
1½ inch diameter with bearings 3 inches long to run in the boxes
before described, on the ends of the Machine & secured with caps,
bolts & Nuts with one or both ends of the arbor running 2 inches beyond
the box, to receive a pulley to drive the cylinder. A Hopper made
of [illegible] with a cap over the cylinder & dust board in front
having an opening against the cylinder from 2 to 6 inches wide to
receive the grain completes the machine. —

What we specifically claim as our invention in the above
described Machine, is the cast iron frame, the sheet iron cylin-
der & the form of the spikes, or cogs, and manner of fastening
them into the cylinder &c.

Witnesses
John B. Pease
C. C. Barnum

Lines Yale
Philo C. Curtis

4

[illegible]

Dr in port folio

[5.90 [illegible]